(12) United States Patent
Shin et al.

(10) Patent No.: US 12,334,523 B2
(45) Date of Patent: Jun. 17, 2025

(54) BATTERY MODULE

(71) Applicant: LG ENERGY SOLUTION, LTD., Seoul (KR)

(72) Inventors: Eun-Gyu Shin, Daejeon (KR); Jeong-O Mun, Daejeon (KR); Dal-Mo Kang, Daejeon (KR); Mi-Geum Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/387,346

(22) Filed: Nov. 6, 2023

(65) Prior Publication Data

US 2024/0072324 A1 Feb. 29, 2024

Related U.S. Application Data

(63) Continuation of application No. 18/079,748, filed on Dec. 12, 2022, now Pat. No. 11,848,431, which is a
(Continued)

(30) Foreign Application Priority Data

Aug. 18, 2016 (KR) .................. 10-2016-0105057

(51) Int. Cl.
*H01M 10/613* (2014.01)
*H01M 10/625* (2014.01)
(Continued)

(52) U.S. Cl.
CPC ....... *H01M 10/613* (2015.04); *H01M 10/625* (2015.04); *H01M 10/647* (2015.04);
(Continued)

(58) Field of Classification Search
None
See application file for complete search history.

(56) References Cited

U.S. PATENT DOCUMENTS

2010/0216007 A1 8/2010 Kane et al.
2012/0313559 A1 12/2012 Tonomura et al.
(Continued)

FOREIGN PATENT DOCUMENTS

CN 104285315 A 1/2015
CN 105723560 A 6/2016
(Continued)

OTHER PUBLICATIONS

Machine translation of JP2013-051099 (Year: 2013).*
(Continued)

*Primary Examiner* — Wyatt P McConnell
(74) *Attorney, Agent, or Firm* — Birch, Stewart, Kolasch & Birch, LLP

(57) ABSTRACT

Discussed is a battery module including a plurality of pouch-type secondary batteries arranged in parallel to each other, each pouch type secondary battery comprising an electrode assembly, a receiving portion configured to receive the electrode assembly and a pouch exterior, a cooling plate arranged under the plurality of pouch-type secondary batteries to accommodate the plurality of pouch-type secondary batteries, and a thermally conductive adhesive between the plurality of pouch-type secondary batteries and the cooling plate. The cooling plate includes a first recess to receive a portion of the pouch exterior and a second recess to receive a portion of the thermally conductive adhesive.

23 Claims, 12 Drawing Sheets

Related U.S. Application Data continuation of application No. 17/071,649, filed on Oct. 15, 2020, now Pat. No. 11,557,807, which is a continuation of application No. 15/780,466, filed as application No. PCT/KR2016/013234 on Nov. 16, 2016, now Pat. No. 10,847,770.

(51) Int. Cl.
| | | |
|---|---|---|
| *H01M 10/647* | (2014.01) | |
| *H01M 10/653* | (2014.01) | |
| *H01M 10/6554* | (2014.01) | |
| *H01M 50/20* | (2021.01) | |
| *H01M 50/211* | (2021.01) | |

(52) U.S. Cl.
CPC ..... *H01M 10/653* (2015.04); *H01M 10/6554* (2015.04); *H01M 50/20* (2021.01); *H01M 50/211* (2021.01); *H01M 2220/20* (2013.01)

(56) References Cited

U.S. PATENT DOCUMENTS

| | | | |
|---|---|---|---|
| 2013/0280576 A1* | 10/2013 | Abe | H01M 10/647 |
| | | | 429/120 |
| 2014/0234691 A1 | 8/2014 | Lee et al. | |
| 2016/0197386 A1 | 7/2016 | Moon et al. | |
| 2016/0233465 A1 | 8/2016 | Lee et al. | |
| 2018/0019508 A1 | 1/2018 | Lee et al. | |

FOREIGN PATENT DOCUMENTS

| | | |
|---|---|---|
| CN | 205452481 U | 8/2016 |
| DE | 10 2008 034 869 A1 | 6/2009 |
| EP | 3 300 164 A1 | 3/2018 |
| EP | 3 358 668 A1 | 8/2018 |
| EP | 3 373 384 A1 | 9/2018 |
| JP | 2000-138040 A | 5/2000 |
| JP | 2008-159440 A | 7/2008 |
| JP | 2012-256521 A | 12/2012 |
| JP | 2013-51099 A | 3/2013 |
| JP | 2015-207541 A | 11/2015 |
| JP | 2017-526102 A | 9/2017 |
| JP | 2018-502431 A | 1/2018 |
| JP | 2018-522373 A | 8/2018 |
| KR | 10-2006-0027264 A | 3/2006 |
| KR | 10-2013-0086678 A | 8/2013 |
| KR | 10-2014-0037351 A | 3/2014 |
| KR | 10-2015-0118375 A | 10/2015 |
| KR | 10-2016-0016500 A | 2/2016 |
| KR | 10-1615928 B1 | 4/2016 |
| WO | WO 2011/061931 A1 | 5/2011 |
| WO | WO 2016/017983 A1 | 2/2016 |

OTHER PUBLICATIONS

Cheng et al., "Simulation research of heat dissipation structure for automotive lithium-ion battery packs", The Chinese Journal of Nonferrous Metals, vol. 25, No. 6, pp. 1607-1616, Jun. 30, 2015.
Indian Office Action, dated Dec. 14, 2020, for Indian Application No. 201827023072, with an English translation.
International Search Report (PCT/ISA/210) issued in PCT/KR2016/013234, mailed on May 17, 2017.
Murashko et al., "Modelling of the Battery Pack Thermal Management System for Hybrid Electric Vehicles", 2014 16th European Conference on Power Electronics and Applications, Lappeenranta University of Technology, Lappeenranta, Finland, Sep. 29, 2014, 11 pages.

* cited by examiner

BATTERY MODULE

CROSS-REFERENCE TO RELATED APPLICATIONS

This application is a Continuation of U.S. patent application Ser. No. 18/079,748 filed on Dec. 12, 2022 (now U.S. Pat. No. 11,848,431, issued on Dec. 19, 2023), which is a Continuation of U.S. patent application Ser. No. 17/071,649 filed on Oct. 15, 2020 (now U.S. Pat. No. 11,557,807, issued on Jan. 17, 2023), which is a Continuation of U.S. patent application Ser. No. 15/780,466 filed on May 31, 2018 (now U.S. Pat. No. 10,847,770, issued on Nov. 24, 2020), which was filed as the National Phase of PCT International Application No. PCT/KR/2016/013234 filed on Nov. 16, 2016, which claims priority under 35 U.S.C. 119 (e) to Korean Patent Application No. 10-2016-0105057 filed in the Republic of Korea on Aug. 18, 2016, the entire contents of which are hereby expressly incorporated by reference into the present application.

BACKGROUND OF THE INVENTION

Technical Field

The present disclosure relates to a battery including one or more secondary batteries, and more particularly, to a battery module, which has a simple structure, is low in volume and weight, and is capable of securing an efficient cooling capability, and a battery pack and an automobile including the same.

Background Art

Currently commercialized secondary batteries include nickel cadmium batteries, nickel metal hydride batteries, nickel zinc batteries, lithium secondary batteries, and the like. Among these secondary batteries, since lithium secondary batteries have advantages of being freely charged and discharged due to almost no memory effect as compared with nickel-based batteries and having extremely low self-discharge rate and high energy density, lithium secondary batteries are spotlighted.

Such lithium secondary batteries mainly include a lithium-based oxide and a carbon material as a positive electrode active material and a negative electrode active material, respectively. Lithium secondary batteries include an electrode assembly, in which a positive electrode plate and a negative electrode plate respectively coated with a positive electrode active material and an negative electrode active material are arranged with a separator therebetween, and an exterior, that is, a battery case, in which the electrode assembly and an electrolyte are sealed and received.

Generally, depending upon shapes of exteriors, lithium secondary batteries may be classified into can-type secondary batteries, in which an electrode assembly is embedded in a metal can, and pouch-type secondary batteries, in which an electrode assembly is embedded in a pouch of an aluminum laminate sheet.

Recently, secondary batteries are widely used in medium and large-sized devices such as automobiles or power storage devices as well as in small-sized devices such as portable electronic devices. When secondary batteries are used in medium and large-sized devices, a large number of secondary batteries are electrically connected to each other for improving capacity and output. In particular, pouch-type secondary batteries are frequently used in medium and large-sized devices due to merits thereof such as ease of stacking, light weight, and the like.

However, since pouch-type secondary batteries are generally packaged with a battery case of a laminate sheet of aluminum and polymer resin, pouch-type secondary batteries do not have high mechanical stiffness, and it is not easy for pouch-type secondary batteries to maintain a stacked state only by themselves. Thus, when a battery module including a large number of pouch-type secondary batteries is configured, a cartridge of a polymer material is frequently used to protect secondary batteries from external impact or the like, prevent movements of secondary batteries, and facilitate stacking.

A cartridge has the shape of a hollow quadrangular plate, and in this case, four sides of the cartridge is configured to surround an outer peripheral portion of a pouch-type secondary battery. In addition, when such a cartridge is used, a large number of cartridges are stacked to constitute a battery module, and secondary batteries may be located in an empty space inside the stacked cartridges.

In addition, when a battery module is configured using such a cartridge or the like, a fastening component for fixing between cartridges may be needed. That is, when a battery module is intended to be configured using a large number of secondary batteries and a large number of cartridges, there are needed fastening components, such as bolts or belts, which are capable of fixing the secondary batteries to the cartridges. Further, in this case, a cartridge or the like needs to include a configuration, for example, a hole or the like, to which a fastening component is coupled.

Therefore, according to a battery module configuration according to the related art, additional costs for cartridges, fastening components, or the like are required, and workability may be deteriorated due to no easy assembly. In addition, since a battery module has a large volume due to such cartridges, fastening components, or the like, there is a limit in reducing the size of a battery module.

In addition, a secondary battery may exhibit deteriorated performance when having a temperature higher than a proper temperature, and may be in danger of explosion or ignition in severe cases. In particular, when a battery module is configured by stacking a large number of pouch-type secondary batteries, since heat generated from a large number of secondary batteries in a narrow space is added up, the temperature of the battery module may be more quickly and severely increased. Further, a battery module included in an automotive battery pack may be frequently exposed to direct sunlight and may be placed under high temperature conditions such as summer or desert. Therefore, when a battery module is configured by using a large number of secondary batteries, it may be extremely important to secure a stable and efficient cooling capability.

SUMMARY OF THE INVENTION

The present disclosure is designed to solve the problems of the related art, and therefore the present disclosure is directed to providing a battery module, which may secure an efficient cooling capability, have a simple and stable structure, facilitate reduction in weight and size, and save manufacturing costs, and a battery pack and an automobile including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided a battery module including: a plurality of pouch-type secondary batteries, which each include an electrode assembly, an electrolyte, and a pouch exterior and are arranged in a left-and-right direction while standing in an up-and-down direction; and a cooling plate including a thermally conductive material, arranged under the plurality of pouch-type secondary batteries while lying in a horizontal direction, and having an upper surface to which lower portions of the secondary batteries are attached and fixed.

Here, the lower portions of the secondary batteries may be attached and fixed to the upper surface of the cooling plate via an adhesive, and the cooling plate may include an accommodation groove recessed downwards in portions of the cooling plate, to which the lower portions of the secondary batteries are attached, and configured to accommodate at least a portion of the adhesive.

The adhesive may be a thermally conductive adhesive.

The cooling plate may include one or more protrusions protruding upwards from the upper surface thereof.

Each protrusion may have an inclined surface such that at least a portion of each protrusion has a decreasing width upwards, and the accommodation groove may be formed at least on the inclined surface of each protrusion.

The secondary batteries may each include a receiving portion configured to receive the electrode assembly and a sealing portion obtained by sealing the pouch exterior, and a lower surface of the receiving portion may be at least partially attached and fixed to the inclined surface of the protrusion.

A lower sealing portion of the pouch exterior of each secondary battery may be folded once or more in an opposite direction to the protrusions to which the secondary batteries are attached, and the folded sealing portion of each secondary battery may be received in a recessed portion formed in the cooling plate by the protrusions.

The cooling plate may be coated with an electrically insulating layer on the inclined surface of each protrusion, except a portion corresponding to the accommodation groove.

The cooling plate may include a blocking wall protruding upwards from the inclined surface at a position lower than the accommodation groove and configured to block the adhesive from moving downwards.

The accommodation groove may be inclined in the same direction as a slope direction of the inclined surface.

The secondary batteries may include a left pouch and a right pouch, which have quadrangular shapes, as the pouch exterior, and the left pouch and the right pouch may each have one side, at which the left pouch and the right pouch are connected to each other in advance and folded, and remaining three sides, at which the left pouch and the right pouch are sealed onto each other, and may be attached to the upper surface of the cooling plate while the folded one side is located in the lower portions of the secondary batteries.

Both the left pouch and the right pouch in the lower portions of the secondary batteries may contact the upper surface of the cooling plate, and the accommodation groove may be formed in all portions of the cooling plate, to which the left pouch and the right pouch are attached.

The accommodation groove may include a portion having an increasing width downwards.

The secondary batteries may be attached and fixed to the cooling plate via a double-sided adhesive tape including an adhesive layer on both surfaces thereof.

In another aspect of the present disclosure, there is also provided a battery pack including the battery module according to the present disclosure.

In a further aspect of the present disclosure, there is also provided an automobile including the battery module according to the present disclosure.

According to an aspect of the present disclosure, a battery module including a large number of secondary batteries may have an improved cooling capability.

In particular, according to a configuration of the present disclosure, a separate cartridge or cooling pin may not be arranged between the secondary batteries and the cooling plate. Therefore, when heat is generated from the secondary batteries, the heat may be directly transferred from the secondary batteries to the cooling plate without passing through another component such as a cartridge or a cooling pin.

Therefore, according to this configuration of the present disclosure, since the number of media on a heat transfer path is reduced, the distance between secondary batteries and the cooling plate may be reduced, and thermal resistance due to contact between media may be reduced, thereby improving heat dissipation efficiency.

Moreover, according to a configuration of the present disclosure, since the secondary batteries are directly attached to the cooling plate, an air layer may be removed or reduced on a heat transfer path from the secondary batteries to the cooling plate, thereby further improving the cooling capability of the battery module.

In addition, according to this configuration of the present disclosure, since the battery module may not include a component such as a cartridge or a cooling pin, the battery module may have a simple structure, and reduction in the weight and volume of the battery module may be facilitated.

Further, according to this configuration of the present disclosure, a battery module assembly process may be simplified, and the manufacturing cost thereof may be reduced.

In addition, according to an aspect of the present disclosure, the secondary batteries may be directly attached and fixed to the cooling plate. Therefore, there may be no need to separately prepare cartridges, fastening members for fixing the cartridges to each other, and the like.

Further, according to an aspect of the present disclosure, fixing between the secondary batteries and the cooling plate may be stably secured, and the battery module may exhibit improved impact resistance to external impact, or the like.

Furthermore, according to an aspect of the present disclosure, the contact area between the secondary batteries and the cooling plate may be increased, thereby improving the cooling capability of the battery module.

BRIEF DESCRIPTION OF THE DRAWINGS

The accompanying drawings illustrate a preferred embodiment of the present disclosure and together with the following detailed description, serve to provide further understanding of the technical features of the present disclosure, and thus, the present disclosure is not construed as being limited to the drawings.

DETAILED DESCRIPTION OF THE PREFERRED EMBODIMENTS

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
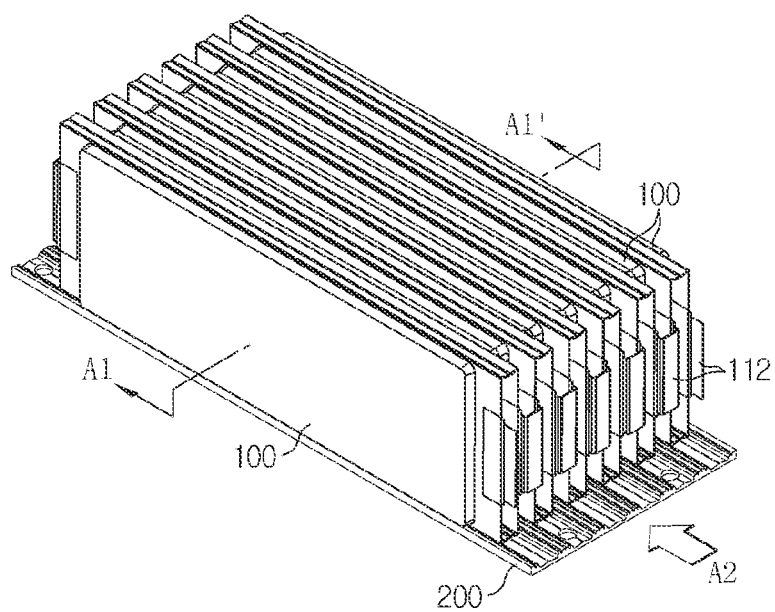
FIG. 1 is a schematic perspective view illustrating a configuration of a battery module according to an embodiment of the present disclosure.
Figure 2:
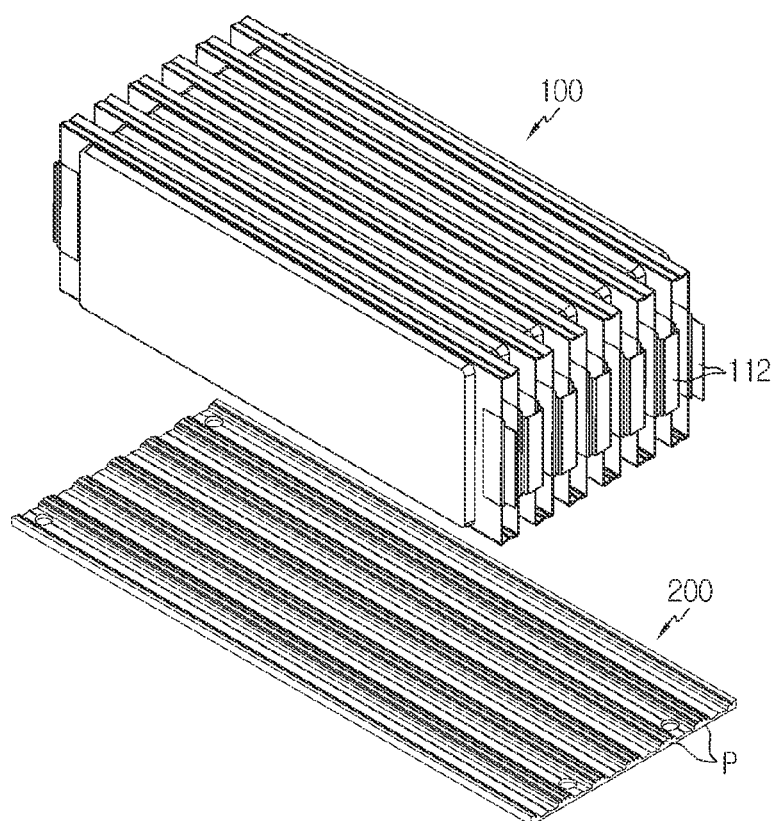
FIG. 2 is an exploded perspective view of a partial configuration of FIG. 1.
Figure 3:
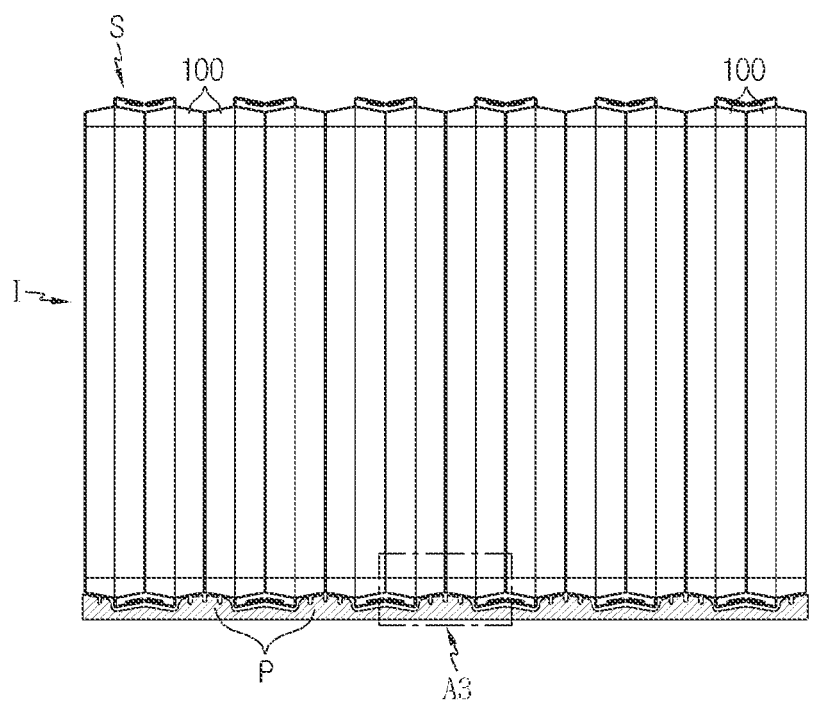
FIG. 3 is a cross-sectional view taken along a line A1-A1' of FIG. 1.

FIG. 1 is a schematic perspective view illustrating a configuration of a battery module according to an embodiment of the present disclosure. In addition, FIG. 2 is an exploded perspective view of a partial configuration of FIG. 1, and FIG. 3 is a cross-sectional view taken along a line A1-A1' of FIG. 1. However, internal components of a secondary battery are not illustrated in FIG. 3 for convenience.

Referring to FIGS. 1 to 3, the battery module according to the present disclosure may include a secondary battery 100 and a cooling plate 200.

One battery module may include a plurality of secondary batteries 100. In particular, each of the plurality of secondary batteries 100 may include a pouch-type secondary battery. Such a pouch-type secondary battery 100 may include an electrode assembly, an electrolyte, and a pouch exterior. A configuration of the pouch-type secondary battery 100 will be described in more detail with reference to FIGS. 4 and 5.

Figure 4:
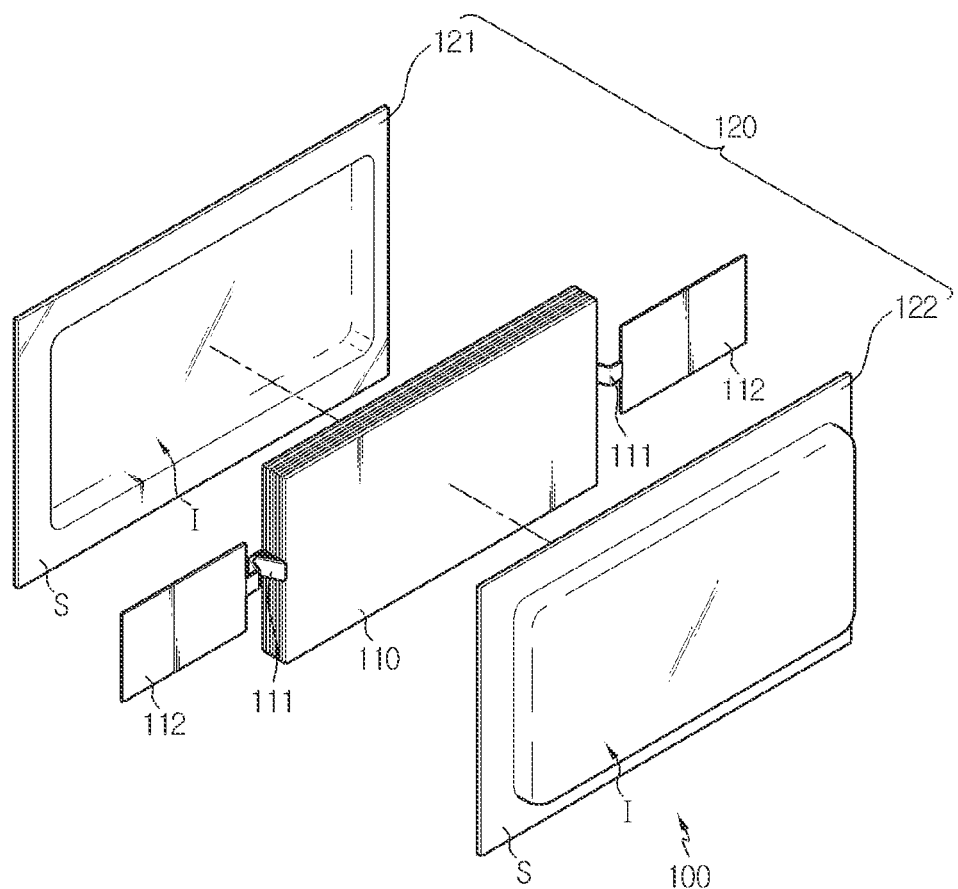
FIG. 4 is a schematic exploded perspective view illustrating a configuration of a pouch-type secondary battery according to an embodiment of the present disclosure.
Figure 5:
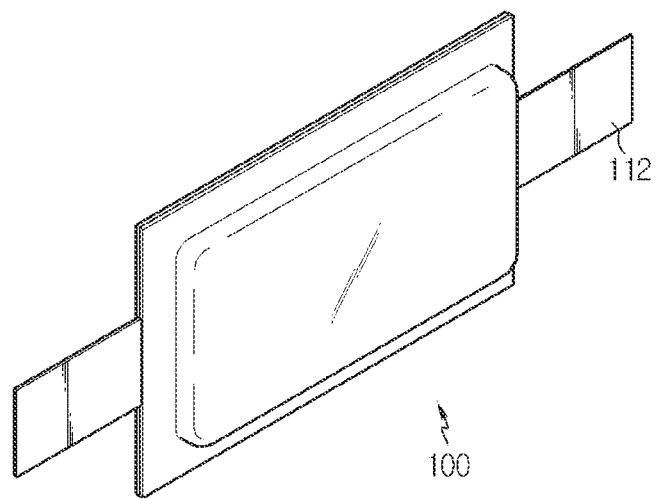
FIG. 5 is a combined perspective view of the configuration of FIG. 4.

FIG. 4 is a schematic exploded perspective view illustrating a configuration of the pouch-type secondary battery 100 according to an embodiment of the present disclosure, and FIG. 5 is a combined perspective view of the configuration of FIG. 4.

An electrode assembly 110 may have a structure in which one or more positive electrode plates and one or more negative electrode plates are arranged with each separator interposed between a positive electrode plate and a negative electrode plate. More specifically, the electrode assembly 110 may be classified into a winding-type electrode assembly, in which one positive electrode plate and one negative electrode plate are wound together with a separator, a stack-type electrode assembly, in which a large number of positive electrode plates and a large number of negative electrode plates are alternately stacked with each separator interposed between a positive electrode plate and a negative electrode plate, and the like.

In addition, a pouch exterior 120 may include an outer insulating layer, a metal layer, and an inner adhesive layer, in the case of the pouch-type secondary battery 100. In particular, the pouch exterior 120 may include a metal thin film, for example, an aluminum thin film, to protect internal components such as the electrode assembly 110 and an electrolyte, supplement electrochemical properties due to the electrode assembly 110 and the electrolyte, and improve heat dissipation properties or the like. In addition, the aluminum thin film may be arranged between the insulating layer including an insulating material and the inner adhesive layer to secure electrical insulation between components internal to the secondary battery 100, such as the electrode assembly 110 and the electrolyte, and other components external to the secondary battery 100.

In addition, the pouch exterior 120 may include a left pouch 121 and a right pouch 122, and at least one of the left pouch 121 and the right pouch 122 may include a receiving portion I formed as an inner space in a recessed shape. Further, the electrode assembly 110 may be received in the receiving portion I of the pouch. Furthermore, the left pouch 121 and the right pouch 122 respectively include sealing portions S on outer peripheral portions thereof, and inner adhesive layers of the sealing portions S are bonded to each other, whereby the receiving portion receiving the electrode assembly 110 may be sealed.

Each electrode plate of the electrode assembly 110 may include an electrode tap, and one or more electrode taps 111 may each be connected to an electrode lead 112. In addition, the electrode lead 112 is arranged between the sealing portion S of the left pouch 121 and the sealing portion S of the right pouch 122 and exposed to an outside of the pouch exterior 120, whereby the electrode lead 112 may function as an electrode terminal of the secondary battery 100.

In the battery module according to an aspect of the present disclosure, variously shaped pouch-type secondary batteries 100 known in the art may be used.

The pouch-type secondary batteries 100 may be arranged in a horizontal direction while each standing in an up-and-down direction. For example, in a configuration of FIGS. 1 and 2, assuming that the side from which the whole of electrode leads 112 are viewed is a front side of a battery module, when the battery module is viewed from the front side of the battery module, a large number of pouch-type secondary batteries 100 may be arranged in a left-and-right direction while standing vertically to the ground such that large surfaces of the pouch-type secondary batteries 100 face in left and right directions.

That is, in the battery module according to the present disclosure, the pouch-type secondary batteries 100 may be configured to stand in such a manner that large outer surfaces of receiving portions face in left and right directions and that the sealing portion is located at upper, lower, front, and rear sides of each secondary battery. In addition, the pouch-type secondary batteries 100 standing as set forth above may be arranged parallel to each other in the left-and-right direction such that large surfaces thereof face each other.

Herein, unless otherwise stated, assuming that the side from which the whole of the electrode leads 112 are viewed as protruding is a front side, directions such as front, rear, left, right, up, and down are divided on the basis of the case that the battery module is viewed from the front side, as described above. That is, on the basis of the case that the battery module is viewed in a direction marked by an arrow A2 in FIG. 1, directions such as front, rear, left, right, up, down, and the like are divided.

At least a portion of the cooling plate 200 may include a thermally conductive material. Thus, the cooling plate 200 may function to transfer heat generated from the secondary battery 100 to an outside of the battery module.

In particular, the cooling plate 200 may include a metal material. For example, the cooling plate 200 may include a single metal material, such as aluminum, copper, or iron, or an alloy material of at least one thereof, on the whole. According to this embodiment of the present disclosure, heat of the secondary battery 100 may be efficiently transferred to the outside of the battery module through the cooling plate 200, stiffness of the secondary battery 100 may be supplemented, and the battery module may be protected from external impact or the like.

Here, a refrigerant such as air or water may flow under the cooling plate 200. For this purpose, the battery module according to the present disclosure may further include a refrigerant supply unit configured to supply air, water, or the like under the cooling plate 200. In addition, the battery module according to the present disclosure may further include a flow path, such as a duct, a pipe, or a heat sink, to provide a path through which a refrigerant such as air or water flows under the cooling plate 200.

The cooling plate 200 may have an approximate plate shape, and may be arranged under the plurality of secondary batteries 100 while lying in the horizontal direction. That is, the cooling plate 200 may be arranged while lying in a direction parallel to a stacking direction of the secondary batteries 100. In addition, the plurality of secondary batteries 100 stacked in the horizontal direction may be mounted on one cooling plate 200 while vertically standing.

In particular, lower portions of the secondary batteries 100 may be attached to the cooling plate 200. That is, the secondary batteries 100 may be fixed to the cooling plate 200 while the lower portions of the secondary batteries 100 directly contact an upper surface of the cooling plate 200.

Figure 6:
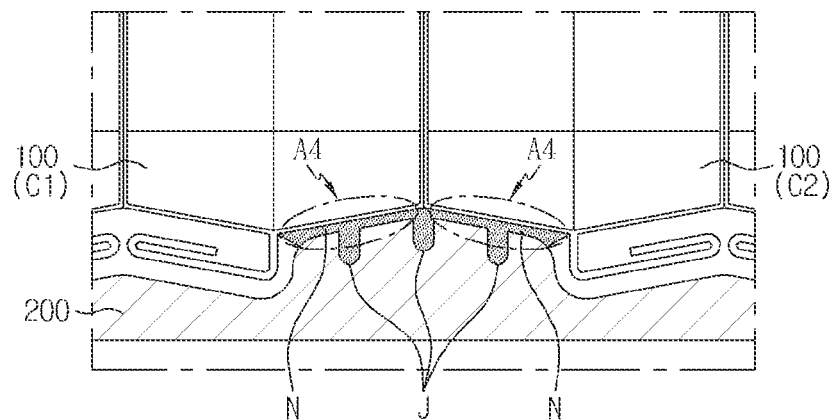
FIG. 6 is a schematic diagram illustrating a configuration in which secondary batteries are attached to a cooling plate, according to an embodiment of the present disclosure.

FIG. 6 is a schematic diagram illustrating a configuration in which the secondary batteries 100 are attached to the cooling plate 200, according to an embodiment of the present disclosure. More specifically, FIG. 6 is an enlarged view illustrating an example of a configuration of a region A3 of FIG. 3.

Referring to FIG. 6, the secondary batteries 100 may be stacked in the left-and-right direction, and a lower portion of each of the secondary batteries 100 may be mounted to the cooling plate 200. Here, an adhesive N may be arranged between the secondary batteries 100 and the cooling plate 200. That is, the secondary batteries 100 may be attached to the cooling plate 200 via the adhesive N. For example, the adhesive N may be applied to the lower portions of the secondary batteries 100 and/or the upper surface of the cooling plate 200, and the secondary batteries 100 and the cooling plate 200 may be bonded and fixed to each other via the adhesive N.

According to this configuration of the present disclosure, the secondary batteries 100 may be simply fixed to the cooling plate 200 via the adhesive N, and the battery module may not include components including cartridges, fastening components such as bolts for fixing the secondary batteries 100, or the like. Therefore, according to this aspect of the present disclosure, the structure and assembly of the battery module may be simplified, and components thereof may be reduced.

In addition, the distance between the secondary batteries 100 and the cooling plate 200 is reduced, and the number of contacts between components is reduced, whereby heat generated from the secondary batteries 100 may be more efficiently transferred to the cooling plate 200. Further, since an air layer in a space between the secondary batteries 100 and the cooling plate 200 may be removed or reduced, deterioration in heat transfer due to the air layer may be prevented.

Preferably, the adhesive may be a thermally conductive adhesive.

The thermally conductive adhesive has higher thermal conductivity than general adhesives, and thus may further improve a heat transfer amount, a heat transfer rate, and the like between the secondary batteries 100 and the cooling plate 200. Therefore, according to this embodiment of the present disclosure, dissipation capability of the heat of the secondary batteries 100 through the cooling plate 200 may be further improved, thereby further improving the cooling capability of the battery module.

In the battery module according to the present disclosure, various thermally conductive adhesives may be used. For example, in the battery module according to an embodiment of the present disclosure, various organic and/or inorganic thermally conductive adhesives, such as thermally conductive epoxy adhesives, thermally conductive silicone adhesives, thermally conductive urethane adhesives, and the like, may be used.

In particular, in the battery module according to the present disclosure, the cooling plate may include accommodation grooves having recessed shapes in a downward direction.

The accommodation grooves, as marked by J in FIG. 6, may have certain depths from the upper surface of the cooling plate in the downward direction. In addition, the accommodation grooves J may be formed in portions of the cooling plate, to which the lower portions of the secondary batteries are attached. Further, the accommodation grooves J may accommodate at least portions of the adhesive N.

According to this configuration of the present disclosure, the adhesive may be more stably located in an attachment region between the secondary batteries and the cooling plate. In addition, in the case that the adhesive is in a flowable state, such as gel or the like, during the process of mounting the secondary batteries to the cooling plate or after mounting the secondary batteries to the cooling plate, there may occur a problem in that the adhesive flows and thus gets out of the attachment region between the secondary batteries and the cooling plate. However, according to the above configuration, the adhesive is located in the attachment region between the secondary batteries and the cooling plate due to the accommodation grooves J, whereby adhesion between the secondary batteries and the cooling plate may be stably secured.

In addition, according to this configuration, a more amount of the adhesive is retained in the accommodation grooves J of the cooling plate, whereby the adhesive may exhibit an improved buffering capability with respect to external impact. In addition, in this case, a contact area between the adhesive and the cooling plate is increased, whereby the cooling capability of the battery module may be further improved due to an increase in a heat transfer amount between the adhesive and the cooling plate.

Preferably, the cooling plate 200 may have protrusions on a surface thereof, to which the secondary batteries 100 are mounted.

Figure 7:
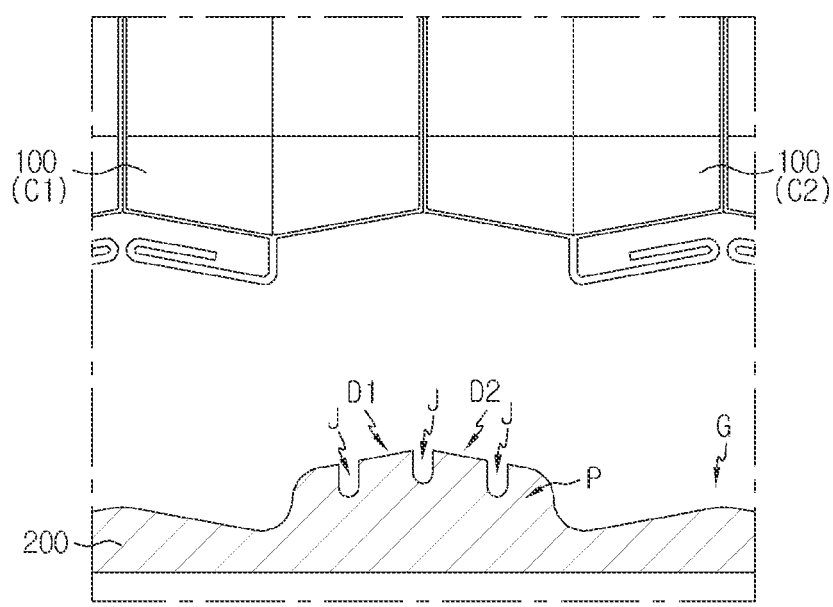
FIG. 7 is a schematic diagram illustrating a state when the secondary batteries are separated from the cooling plate, in the configuration of FIG. 6.

FIG. 7 is a schematic diagram illustrating a state when the secondary batteries 100 are separated from the cooling plate 200, in the configuration of FIG. 6. However, the adhesive is not shown in FIG. 7 for convenience.

Referring to FIG. 7, the cooling plate 200 may have protrusions protruding upwards from the upper surface thereof, as marked by P. According to this configuration of the present disclosure, mounting positions of the secondary batteries 100 may be guided by the protrusions P, thereby improving assemblability of the battery module. In addition, the secondary batteries 100 is suppressed from moving in left and right directions due to the protrusions P, whereby a bonding force between the secondary batteries 100 and the cooling plate 200 may be further improved. Further, since the cooling plate 200 may have an increased upper surface area even when having an equal horizontal length, a contact area between the secondary batteries 100 and the cooling plate 200 may be further increased. Therefore, the amount and rate of heat transferred from the secondary batteries 100 to the cooling plate 200 may be increased, thereby improving the cooling capability of the battery module.

As shown in FIG. 3 and the like, one cooling plate 200 may have a plurality of protrusions P. According to this configuration of the present disclosure, due to the plurality of protrusions P, the bonding force between the secondary batteries 100 and the cooling plate 200 is further strengthened, and the contact area between the secondary batteries 100 and the cooling plate 200 may be further increased. In particular, when the battery module includes a slightly large number of secondary batteries 100, for example, five or more secondary batteries 100, it is good to provide a large number of protrusions P such that all of the secondary batteries 100 are contiguous to the protrusions P.

In addition, as shown in FIG. 2, the protrusions P may lengthily extend on the upper surface of the cooling plate 200 in a front-and-rear direction. That is, the protrusions P may lengthily extend from a front end to a rear end of the cooling plate 200 in a direction parallel to length directions of lower sides of the secondary batteries 100. According to this embodiment of the present disclosure, the contact area between the secondary batteries 100 and the cooling plate 200 may be increased by further increasing the surface area of the cooling plate 200. Further, according to an embodiment of the present disclosure, a fixing force between the secondary batteries 100 and the cooling plate 200 may be improved.

In particular, the accommodation grooves J may be formed in the protrusions P of the cooling plate. For example, the accommodation grooves J may be formed on upper surfaces of the protrusions P. In addition, the accommodation grooves J, like the protrusions P, may lengthily extend on the upper surface of the cooling plate in the front-and-rear direction.

Also preferably, at least a portion of each of the protrusions P of the cooling plate 200 may have a decreasing width upwards. In this case, each of the protrusions P of the cooling plate 200 may have inclined surfaces as marked by D1 and D2 in FIG. 7, the inclined surfaces being inclined at certain angles with respect to the ground on which the cooling plate 200 is placed. For example, an upper portion of each of the protrusions may have a triangular shape having a decreasing width in the left-and-right direction upwards, as shown in FIGS. 6 and 7. In particular, each of the protrusions may have a vertex on an upper end thereof without including a flat portion in the horizontal direction.

According to this embodiment of the present disclosure, the secondary batteries 100 may be more closely bonded to the cooling plate 200. That is, according to the above embodiment, when the secondary batteries 100 are mounted on the cooling plate 200, the secondary batteries 100 may be moved downwards along the inclined surfaces of the protrusions of the cooling plate 200, and thus be as close as possible to the cooling plate 200. Therefore, the distance between the secondary batteries 100 and the cooling plate 200 may be reduced, and the bonding force therebetween may be further improved, thereby further improving the cooling capability of the battery module.

Here, the accommodation grooves J may be formed at least on the inclined surfaces of the protrusions. In this case, since the adhesive may be accommodated in the accommodation grooves J during the process of applying the adhesive to the inclined surfaces of the protrusions or the process of mounting the secondary batteries to the cooling plate, a certain amount or more of the adhesive may be stably retained between the secondary batteries and the inclined surfaces of the protrusions. In particular, when the adhesive is in a flowable state, such as gel or the like, there is a concern that the adhesive flows downwards along the inclined surfaces of the protrusions. However, according to the configuration of the present disclosure, since a considerable amount of the adhesive may be accommodated in the accommodation grooves J, most of the adhesive may be prevented from departing from regions on the inclined surfaces of the protrusions.

Inclined surfaces of outer portions of the protrusions may be substantially flat, except portions corresponding to the accommodation grooves J. Thus, the secondary batteries 100 may be smoothly moved downwards as much as possible along the inclined surfaces of the protrusions. Therefore, according to this configuration of the present disclosure, the secondary batteries 100 may be as close as possible to the cooling plate 200.

As described above, the secondary batteries 100 may each include the receiving portion I receiving the electrode assembly and the sealing portion S obtained by sealing the pouch exterior by thermal fusion or the like. Here, the receiving portion I and the sealing portion S may have different outer thicknesses (lengths in the left-and-right direction in FIG. 7) from each other. That is, in the pouch-type secondary batteries 100, the receiving portion I may be generally thicker than the sealing portion S, and thus, there may be a step between the receiving portion and the sealing portion. Therefore, when the secondary batteries 100 stand in the up-and-down direction, considerable upper and lower regions of the receiving portion may be exposed without being covered with the sealing portions S.

Here, in the secondary battery 100, the lower region of the receiving portion may be at least partially attached and fixed to the inclined surfaces of a protrusion. For example, as shown in a region marked by A4 in FIG. 6, the adhesive N is arranged between a lower surface of the receiving portion of the secondary battery 100 and the inclined surfaces of the protrusion of the cooling plate 200, whereby the secondary battery 100 and the cooling plate 200 may be bonded and fixed to each other.

According to this configuration of the present disclosure, the bonding force between the secondary battery 100 and the cooling plate 200 may be further strengthened. That is, the inclined surfaces of the protrusion are inclined at certain angles with respect to a direction parallel to the ground, whereby the secondary battery 100 may be suppressed from moving both in the up-and-down direction and in the left-and-right direction. Therefore, when the secondary battery 100 is boned to the inclined surfaces of the protrusion, one bonding configuration allows the movement of secondary battery 100 in the up-and-down and left-and-right directions to be limited as much as possible.

In addition, according to this configuration of the present disclosure, the contact area between the cooling plate 200 horizontally placed in the left-and-right direction and the secondary battery 100 vertically standing in the up-and-down direction may be as large as possible. Therefore, the adhesion between the secondary battery 100 and the cooling plate 200 is stably secured, and the heat transfer efficiency therebetween may be effectively improved.

Further, when the lower surface of the receiving portion of the secondary battery 100 is bonded to the inclined surfaces of the protrusion of the cooling plate 200 via a thermally conductive adhesive, the heat transfer efficiency between the secondary battery 100 and the cooling plate 200 may be further improved.

Preferably, in at least some of the protrusions, left and right upper surfaces thereof are respectively attached and fixed to different secondary batteries 100. For example, as shown in FIG. 7, the protrusion of the cooling plate 200 may have the inclined surfaces D1 and D2 respectively on left and right sides with reference to the upper end vertex. In particular, the left inclined surface D1 and the right inclined surface D2 may have incline directions opposite to each other, an equal absolute value of an angle, and an equal length.

In such a configuration, different secondary batteries 100 may be respectively attached and fixed to the left inclined surface D1 and the right inclined surface D2 of the protrusion. For example, in the configuration shown in FIG. 7, a right lower surface of the receiving portion of a left secondary battery 100 (C1) may be bonded to the left inclined surface of the protrusion, and a left lower surface of the receiving portion of a right secondary battery 100 (C2) may be bonded to the right inclined surface of the protrusion.

In this case, two secondary batteries 100 that are adjacent with reference to one protrusion P may be bonded and fixed to each other. Therefore, according to this configuration of the present disclosure, a large number of secondary batteries 100 may be attached and fixed to a small number of protrusions P. For example, when the battery module includes an even number of secondary batteries 100, the cooling plate 200 may include the protrusions as many as half (½) the total number of the secondary batteries 100. For example, as in the configuration shown in FIG. 3, when the battery module includes 12 secondary batteries 100, the cooling plate 200 may include 6 protrusions. In addition, when the battery module includes an odd number of secondary batteries 100, the cooling plate 200 may include the protrusions as many as a number greater by one than half (½) the total number of the secondary batteries 100. In the case of this configuration, all of the secondary batteries 100 may be attached and fixed to the protrusions of the cooling plate 200.

The secondary battery 100 may include a sealing portion on each side thereof. Here, the sealing portion of the secondary battery 100 may be folded. In particular, a lower sealing portion and an upper sealing portion of the secondary battery 100 may be folded. According to this configuration of the present disclosure, the folding of the sealing portion allows the overall size of the battery module to be reduced, and in particular, the distance between the receiving portion of the secondary battery 100 and the cooling plate 200 to be reduced.

In particular, the lower sealing portion of the secondary battery 100 may be folded in a direction opposite to the protrusion. For example, in the configuration of FIG. 6, the protrusion of the cooling plate 200 is located at a right lower side of the secondary battery C1, whereby a right lower surface of the receiving portion may be attached to an inclined surface of the protrusion. Here, the lower sealing portion of the secondary battery C1 may be folded in a left direction that is an opposite direction to the protrusion. In addition, the protrusion of the cooling plate 200 is located at a left lower side of the secondary battery C2, and the lower sealing portion of the secondary battery C2 may be folded in a right direction that is an opposite direction to the protrusion to which the secondary battery C2 is attached.

According to this configuration of the present disclosure, there may be an area in which the receiving portion of the secondary battery 100 and the cooling plate 200 are in direct contact with each other without a folding portion therebetween. Therefore, heat generated from the receiving portion may be effectively transferred to the cooling plate 200. In addition, according to this configuration of the present disclosure, the fixing force of the secondary battery 100 with respect to the cooling plate 200 may be stably secured.

Further, the sealing portion of the secondary battery 100 may be folded once or more. For example, the lower sealing portion of the secondary battery 100 may be folded twice, as shown in FIG. 6 and the like. In particular, according to a configuration in which the sealing portion is folded a plurality of times, penetration of foreign substances such as moisture into the secondary battery 100 through a thermally fused region of the sealing portion or leakage of the electrolyte out of the secondary battery 100 therethrough may be more effectively prevented.

As in the above embodiment, when the lower sealing portion of the secondary battery 100 is folded, the folded lower sealing portion may be received in a recess formed in the cooling plate 200 due to the protrusion.

For example, when the cooling plate 200 includes a plurality of protrusions, a downwardly recessed-shaped recess, as marked by G in FIG. 7, may be formed between the protrusions. Here, the folded lower sealing portion of the secondary battery 100 may be received in the recess G.

Also preferably, the sealing portion of an outermost secondary battery 100 may be folded in an inward direction. For example, as in the configuration shown in FIG. 3, the upper and lower sealing portions of a rightmost secondary battery among the secondary batteries 100 included in the battery module may be folded in the left direction that is the inward direction. In addition, the upper and lower sealing portions of a leftmost secondary battery among the secondary batteries included in the battery module may be folded in the right direction that is the inward direction.

According to this configuration of the present disclosure, the receiving portion, instead of the sealing portion, of the secondary battery 100 is attached to an outer protrusion of the cooling plate 200, whereby the fixing force between the outermost secondary battery 100 and the cooling plate 200 may be strengthened. In addition, the sealing portion is not exposed to the outside of the battery module, whereby moisture or various foreign substances may be prevented from penetrating into the outermost secondary battery 100 through the sealing portion.

Although the configuration, in which the secondary battery 100 is attached only to the protrusion of the cooling plate 200, is mainly described in the several embodiments set forth above, the present disclosure is not limited to these embodiments.

Figure 8:
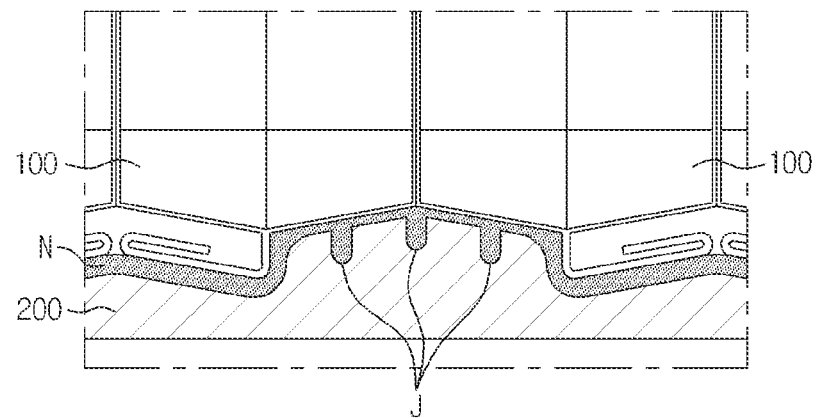
FIG. 8 is a partially enlarged view illustrating a configuration of a lower portion of a battery module according to another embodiment of the present disclosure.

FIG. 8 is a partially enlarged view illustrating a configuration of a lower portion of a battery module according to another embodiment of the present disclosure. For example, FIG. 8 illustrates another example of the configuration of the region A3 of FIG. 3.

Referring to FIG. 8, the adhesive may be provided to vertical surfaces of the protrusions as well as the upper surfaces, that is, the inclined surfaces of the protrusions of the cooling plate 200. In addition, the adhesive may also be provided to portions of the cooling plate 200 except the protrusions, for example, to at least portions of recesses G between the protrusions. Thus, the receiving portion and the sealing portion of the secondary battery 100 may be bonded together to the cooling plate 200.

According to this configuration of the present disclosure, since the contact area between the secondary battery 100 and the cooling plate 200 via the adhesive is increased, the bonding force and heat transfer efficiency between the secondary battery 100 and the cooling plate 200 may be improved. In addition, more air layers are removed from the heat transfer path between the secondary battery 100 and the cooling plate 200, thereby further reducing thermal resistance due to the air layers. Further, when the adhesive is applied to the cooling plate 200, since it is sufficient to apply the adhesive to the whole upper surface of the cooling plate 200 rather than only to the inclined surfaces, application processability of the adhesive or the like may be improved.

In particular, according to the configuration of the present disclosure, since a certain amount or more of the adhesive may be stably provided to the protrusion protruding upwards due to the accommodation grooves J of the protrusion, the adhesive may be prevented from being excessively concentrated into the recess G located lower than the protrusion P.

Figure 9:
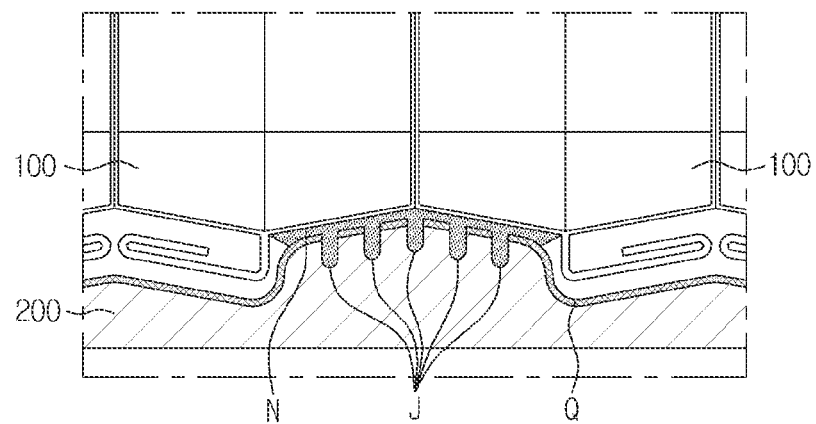
FIG. 9 is a partially enlarged view illustrating a configuration of a lower portion of a battery module according to yet another embodiment of the present disclosure.

FIG. 9 is a partially enlarged view illustrating a configuration of a lower portion of a battery module according to yet another embodiment of the present disclosure. For example, FIG. 9 illustrates yet another example of the configuration of the region A3 of FIG. 3. Here, descriptions similar to the descriptions of the previous embodiments will be omitted, and differences will be mainly described in detail.

Referring to FIG. 9, the upper surface of the cooling plate 200 may be at least partially coated with an electrically insulating layer marked by Q. The electrically insulating layer is a coating layer including an electrically insulating material, and may be arranged on the upper surface of the cooling plate. The electrically insulating layer may be formed in various manners, such as powder coating, plating, insulating sheet, and the like.

According to this configuration of the present disclosure, electrical insulation between the secondary battery and the cooling plate may be stably secured due to the electrically insulating layer Q. In particular, even though cracks are generated in a folding region of the lower sealing portion of the secondary battery or a metal layer at an end of the sealing portion is exposed and brought into contact with the cooling plate, the electrically insulating layer Q prevents a short circuit from being generated inside the battery module, thereby securing a withstand voltage performance of the battery module.

In particular, the electrically insulating layer Q may be coated on portions of the inclined surfaces of the protrusion of the cooling plate except the accommodation grooves J. That is, although coated on the protrusion of the cooling plate, the electrically insulating layer may not be coated on the accommodation grooves J.

According to this configuration of the present disclosure, the withstand voltage performance of the battery module may be stably secured by the electrically insulating layer Q, and in the accommodation grooves J, heat of the secondary battery may be directly transferred to the cooling plate via the adhesive without the electrically insulating layer. Therefore, in this case, the battery module may exhibit an improved withstand voltage performance while minimizing deterioration in cooling capability.

Figure 10:
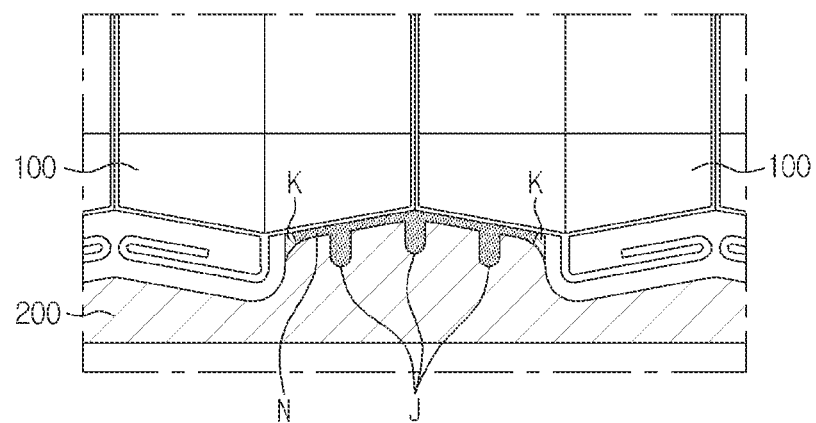
FIG. 10 is a partially enlarged view illustrating a configuration of a lower portion of a battery module according to yet another embodiment of the present disclosure.

FIG. 10 is a partially enlarged view illustrating a configuration of a lower portion of a battery module according to yet another embodiment of the present disclosure. For example, FIG. 10 illustrates yet another example of the configuration of the region A3 of FIG. 3. Here, descriptions similar to the descriptions of the previous embodiments will be omitted, and differences will be mainly described in detail.

Referring to FIG. 10, the cooling plate 200 may include a blocking wall marked by K.

The blocking wall K may protrude upwards from the upper surface of the cooling plate. In addition, the blocking wall K may block downward movement of the adhesive. For example, a left blocking wall K in FIG. 10 may block the adhesive on a right side thereof from moving leftwards, and a right blocking wall K in FIG. 10 may block the adhesive on a left side thereof from moving rightwards.

In particular, the blocking wall K may be arranged on the protrusion P of the cooling plate, and may block the adhesive from falling on portions of the cooling plate except the protrusions P, for example, on the recess G. In addition, the blocking wall K may be arranged on the inclined surfaces of the cooling plate, and may block the adhesive from flowing down along the inclined surfaces.

According to this configuration of the present disclosure, when the cooling plate includes the protrusion, particularly the protrusion having the inclined surfaces, the adhesive is allowed to be properly located on the protrusion. Therefore, in this case, the adhesive may allow the adhesion and heat transfer capability between the secondary battery and the cooling plate to be stably secured.

More preferably, the blocking wall K may be located lower than a position at which the accommodation grooves are arranged, on the inclined surfaces of the protrusion of the cooling plate. That is, the protrusion shown in FIG. 10 includes two blocking walls, and the two blocking walls are arranged at both ends of the protrusion. In addition, the accommodation grooves J are located between blocking walls of the protrusion. Here, all of the two blocking walls are located lower than positions at which three accommodation grooves J are arranged, on the inclined surfaces. According to this configuration, the adhesive may be more properly accommodated in the accommodation grooves J, whereby the capability of the accommodation grooves to retain the adhesive may be further improved.

Figure 11:
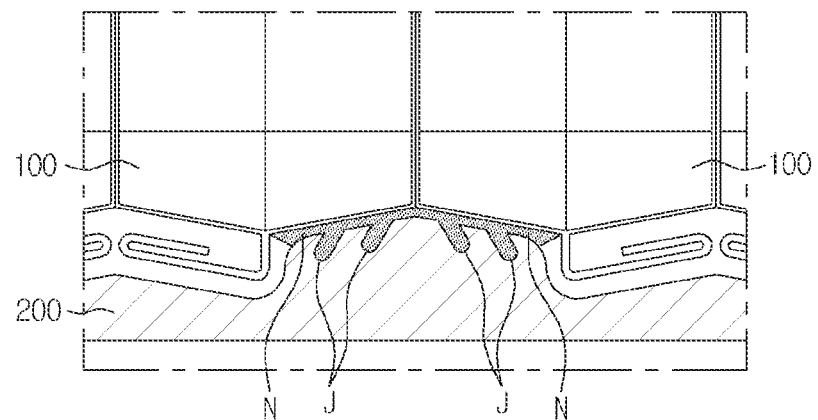
FIG. 11 is a partially enlarged view illustrating a configuration of a lower portion of a battery module according to yet another embodiment of the present disclosure.

FIG. 11 is a partially enlarged view illustrating a configuration of a lower portion of a battery module according to yet another embodiment of the present disclosure. For example, FIG. 11 illustrates yet another example of the configuration of the region A3 of FIG. 3. Here, descriptions similar to the descriptions of the previous embodiments will be omitted, and differences will be mainly described in detail.

Referring to FIG. 11, the accommodation grooves J are not parallel to the up-and-down direction, that is, a direction perpendicular to the ground, and may have shapes inclined at certain angles with respect to the direction perpendicular to the ground. In particular, the accommodation grooves J may be inclined in the same directions as slope directions of the inclined surfaces of the protrusion of the cooling plate. Here, the term "same directions" does not mean that slope angles of the accommodation grooves are equal to slope angles of the inclined surfaces, but may mean that the accommodation grooves are inclined in the left or right direction like the incline directions of the inclined surfaces of the protrusion. That is, in FIG. 11, left and right portions of the protrusion respectively have the inclined surfaces, and two accommodation grooves J are formed on each inclined surface. Here, an upper end of the left inclined surface faces in the right direction, and an upper end of the right inclined surface faces in the left direction. In such a protrusion structure, two left accommodation grooves may be inclined such that upper ends thereof face in the right direction like in the left inclined surface. That is, the upper ends of the left accommodation grooves may be located further to the right than lower ends thereof. On the other hand, two right accommodation grooves may be inclined such that upper ends thereof face in the left direction like in the right inclined surface. That is, the upper ends of the right accommodation grooves may be located further to the left than lower ends thereof.

According to this configuration of the present disclosure, the capability of the accommodation grooves J to accommodate the adhesive may be further improved. That is, the adhesive N may flow along the inclined surfaces of the protrusion during the process of applying the adhesive to the inclined surfaces of the protrusion, and according to the above configuration, the accommodation grooves J may have shapes along a flow direction of the adhesive. Therefore, the adhesive may more smoothly introduced into the accommodation grooves J.

Figure 12:
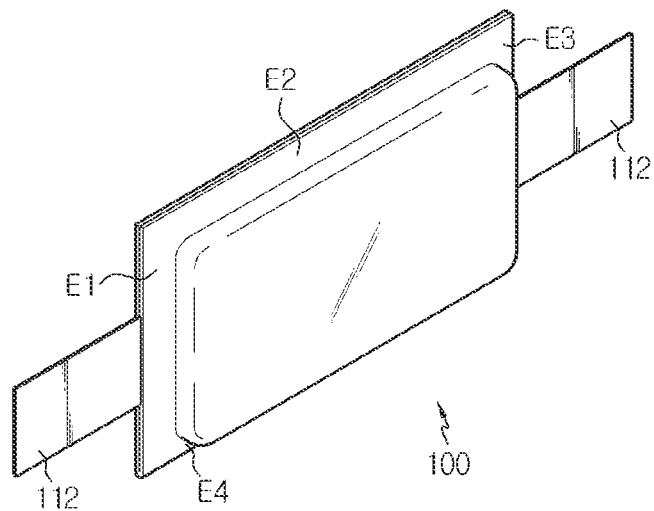
FIG. 12 is a schematic right side view illustrating a configuration of a secondary battery included in a battery module according to another embodiment of the present disclosure.
Figure 13:
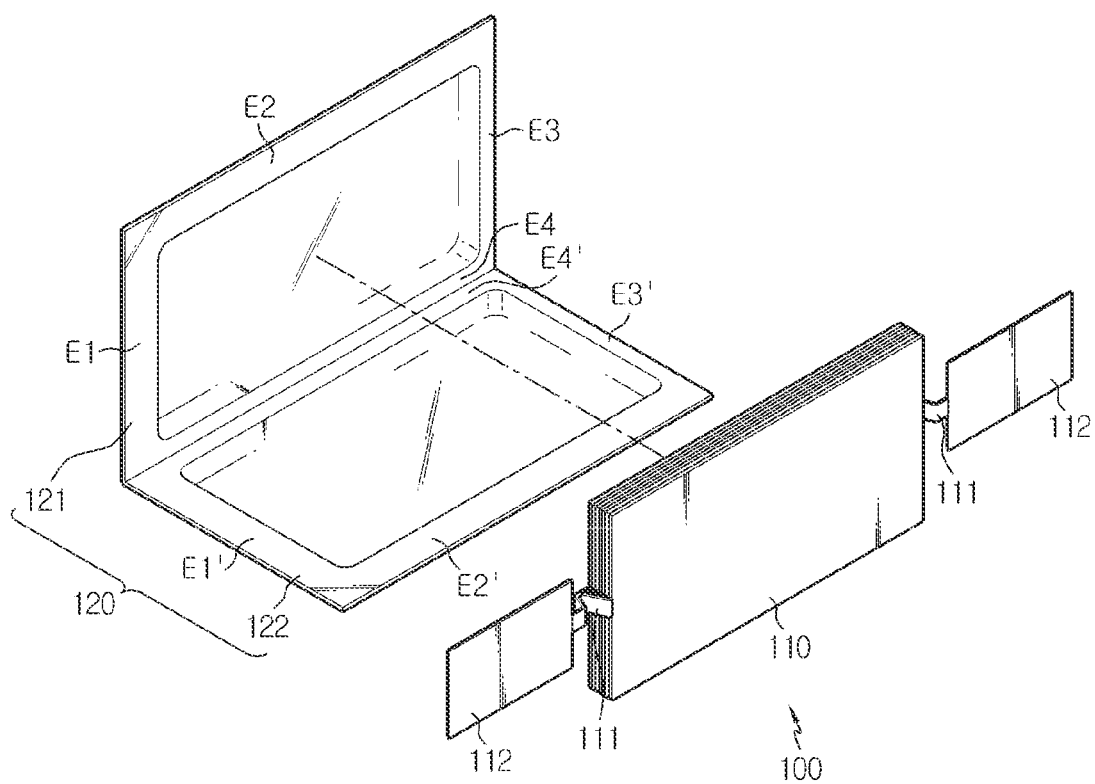
FIG. 13 is an exploded perspective view of the secondary battery of FIG. 12.

FIG. 12 is a schematic right side view illustrating a configuration of the secondary battery 100 included in the battery module according to another embodiment of the present disclosure, and FIG. 13 is an exploded perspective view of the secondary battery 100 of FIG. 12.

Referring to FIGS. 12 and 13, the secondary battery 100 of the battery module according to the present disclosure may be sealed at three sides thereof. That is, as shown in FIG. 12, when viewed from right to left, the pouch-type secondary battery 100 may have a quadrangular shape having four sides. Here, the four sides are respectively denoted by E1, E2, E3, and E4, as shown in FIGS. 12 and 13. Among the four sides, three sides E1, E2, and E3 may be sealed, and one side E4 remaining may not be sealed.

Here, as shown in FIG. 13, the secondary battery 100 may include a left pouch 121 and a right pouch 122, and the left pouch 121 and the right pouch 122 may be partially coupled to each other instead of being physically separated from each other. That is, as shown in FIG. 13, the left pouch 121 and the right pouch 122 may be manufactured such that a side E4 of the left pouch 121 and a side E4' of the right pouch 122 may be connected to each other. In addition, the side E4 of the left pouch 121 and the side E4' of the right pouch 122 may be folded in a connection region therebetween. In other words, while one side of the left pouch 121 and one side of the right pouch 122 are connected to each other, the left pouch 121 and the right pouch 122 may be rotated and thus folded.

In addition, when the electrode assembly is received in receiving portions of the left pouch 121 and the right pouch 122, three sides of the left pouch 121 and three sides of the right pouch 122, which are not respectively connected, that is, sides E1 to E3 of the left pouch 121 and sides E1' to E3' of the right pouch 122 may be respectively sealed onto each other by a method such as thermal fusion.

According to this embodiment of the present disclosure, in the pouch exterior, the side E4, which corresponds to a side folded without being sealed, may have a smaller width than the sides E1 to E3, which correspond to sides subjected to sealing. Therefore, the receiving portion at the side E4 may be closer to an outer side portion of the secondary battery 100 than those at the other sides.

Figure 14:
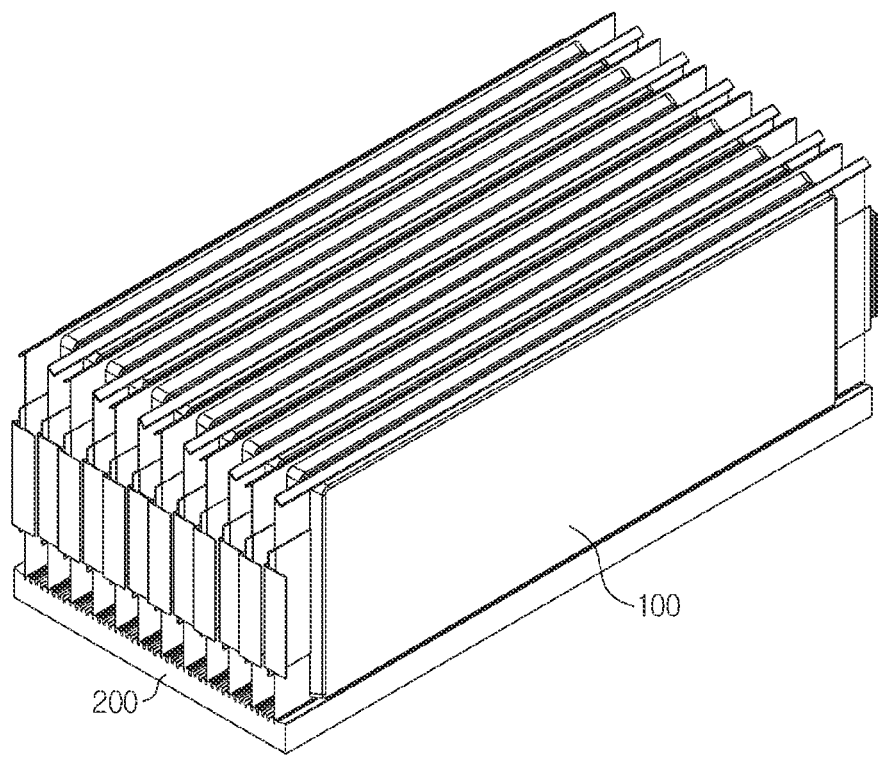
FIG. 14 is a perspective view illustrating a configuration of a battery module including the secondary battery of FIG. 12.
Figure 15:
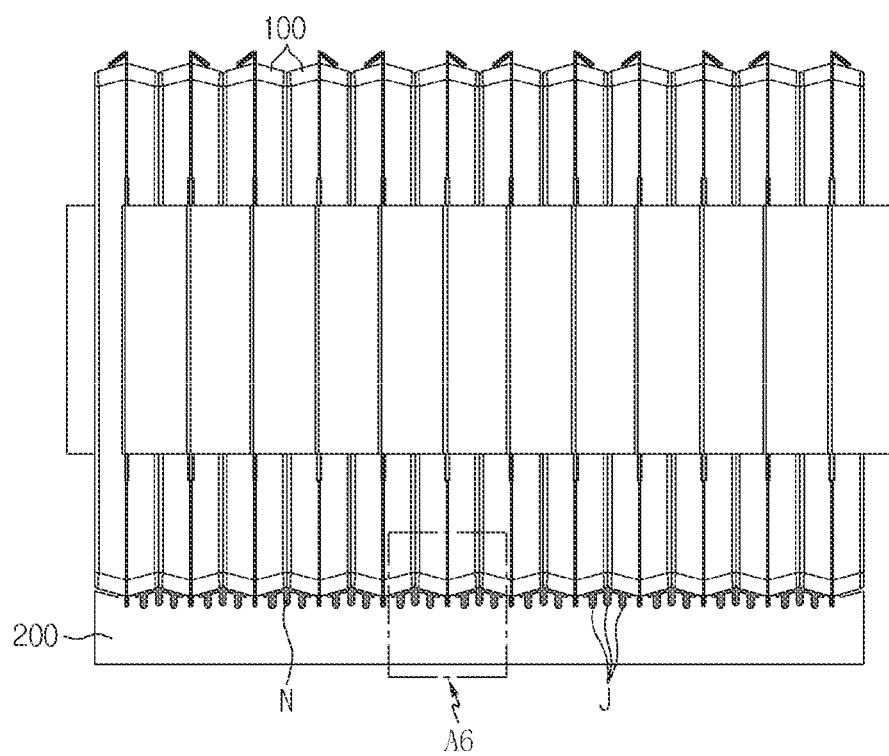
FIG. 15 is a front view of the battery module of FIG. 14.

FIG. 14 is a perspective view illustrating a configuration of a battery module including the secondary battery 100 shown in FIG. 12, and FIG. 15 is a front view of the battery module of FIG. 14. Hereinafter, descriptions similar to the descriptions of the previous embodiments will be omitted, and differences will be mainly described in detail.

Referring to FIGS. 14 and 15, in the battery module, one non-sealed side of the secondary battery 100 may be located in the lower portion of the secondary battery 100, and may be attached to the upper surface of the cooling plate 200. For example, the side denoted by E4 in FIG. 12 is located in the lower portion of the secondary battery 100, whereby the side E4 may be mounted on and contact the upper surface of the cooling plate 200.

According to this configuration of the present disclosure, the receiving portion of the secondary battery 100 may be located more closer to the cooling plate 200. That is, the non-sealed side may have a smaller width than the sealed sides, the electrode assembly received in the receiving portion may be further closer to the cooling plate 200. In addition, in the case of the non-sealed side E4, since there is no need for the sealing portion to be folded due to the small width of the non-sealed side E4, a structure in which the folded sealing portion is arranged between the receiving portion of the secondary battery and the cooling plate may not be formed. Therefore, heat generated from the electrode assembly may be more quickly and smoothly transferred to the cooling plate 200.

In particular, in this embodiment, the lower portion of the secondary battery 100 may be attached to the upper surface of the cooling plate 200 in a larger area. This will be described in detail with reference to FIG. 16.

Figure 16:
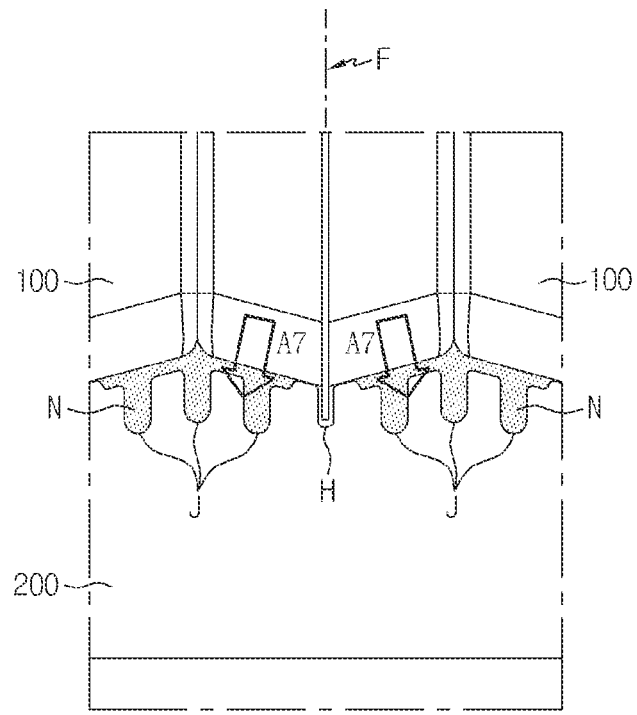
FIG. 16 is an enlarged view of a region A6 of FIG. 15.

FIG. 16 is an enlarged view of a region A6 of FIG. 15.

Referring to FIG. 16, both the left lower and right lower portions of the secondary battery 100 with reference to a left-and-right-direction central line may contact the upper surface of the cooling plate 200. That is, when the left-and-right-direction central line is assumed to be a line F for the secondary battery 100 standing in the up-and-down direction, the lower surface of the secondary battery 100 may contact the upper surface of the cooling plate 200 at left and right sides of the line F. In other words, in the configuration of FIG. 16, both the left pouch and the right pouch of the secondary battery may contact the upper surface of the cooling plate. More specifically, in FIG. 16, the left pouch may be attached to a right inclined surface of a left protrusion, and the right pouch may be attached to a left inclined surface of a right protrusion.

Here, the accommodation grooves J may be formed in both portions of the cooling plate, to which the left pouch and the right pouch are attached. That is, as shown in FIG. 16, the accommodation grooves may be formed both on the right inclined surface of the left protrusion, to which the left pouch is attached, and the left inclined surface of the right protrusion, to which the right pouch is attached.

In this case, heat generated from the secondary battery 100 may be transferred to the cooling plate 200 through both left lower and right lower surfaces of the secondary battery 100, as indicated by an arrow A7. Therefore, according to this configuration of the present disclosure, the contact area between the secondary battery 100 and the cooling plate 200 is increased, thereby improving the heat transfer efficiency therebetween.

In addition, in this configuration, the adhesive may be provided under the left lower and right lower surfaces of the secondary battery 100, thereby bonding the secondary battery 100 to the cooling plate 200. Therefore, the fixing force between the secondary battery 100 and the cooling plate 200 may further improved.

In the above configuration of the secondary battery 100, even the non-sealed side may slightly protrude downwards from the receiving portion. Thus, the cooling plate 200 may include a slit denoted by H in FIG. 16 such that the non-sealed side may be inserted into the slit. In addition, the slit may be lengthily formed in the cooling plate 200 in a front-and-rear direction.

The pouch-type secondary battery 100 may have an approximate rectangular shape, when viewed from top to bottom while lying down. Here, an outer peripheral portion of the pouch-type secondary battery 100 may have two long sides and two short sides. For example, referring to FIGS. 12 and 13, a rim portion of the pouch-type secondary battery 100 may have four sides E1, E2, E3, and E4, and among these sides, two sides E1 and E3 may be short in length, and remaining two sides E2 and E4 may be relatively long in length. Here, at least one of the two long sides E2 and E4 of the pouch-type secondary battery 100 may be attached and fixed to the cooling plate 200. For example, in the configuration shown in FIGS. 12 and 13, the plurality of pouch-type secondary batteries 100 may be stacked in the left-and-right direction while standing in the up-and-down direction, and each secondary battery 100 may have two long sides E2 and E4 respectively located in upper and lower portions thereof and two short sides E1 and E3 respectively located in front and rear portions thereof. In addition, a lower long side E4 of each secondary battery 100 may be attached to the cooling plate 200 via an adhesive, an adhesive tape, or the like.

According to this embodiment of the present disclosure, the long side of the outer peripheral portion of the secondary battery 100 is bonded to the cooling plate 200, thereby further improving the fixing force due to bonding. In addition, the secondary battery 100 and the cooling plate 200 are in direct contact with each other in a larger area, thereby further improving the heat transfer efficiency between the secondary battery 100 and the cooling plate 200. Further, since the electrode lead 112 may protrude from the short side of the pouch-type secondary battery 100, it is good to apply the adhesive to the long side rather than to the short side.

In addition, the secondary batteries 100 may be stacked such that large surfaces thereof are in face-to-face contact with each other. For example, as shown in FIGS. 3 and 15, when the secondary batteries 100 are stacked in the left-and-right direction, large surfaces of each secondary battery 100, that is, the outer surfaces of the receiving portions face in the left and right directions, and the outer surface of each receiving portion may be in face-to-face contact with the outer surface of the receiving portion of an adjacent secondary battery 100.

According to this configuration of the present disclosure, reduction in size and weight of the battery module may be easily accomplished. In addition, according to an aspect of the present disclosure, all of the secondary batteries 100 may directly exchange heat with the cooling plate 200 under the secondary batteries 100. Thus, the battery module may not have a configuration like a battery module configuration according to the related art, in which a cooling pin is arranged between the secondary batteries 100. Therefore, the battery module according to the present disclosure allows the secondary batteries 100 to be in direct face-to-face contact with each other, and thus, may be compact and light and have a simple structure.

The accommodation grooves J may have various shapes other than the shapes shown in the several diagrams described above.

Figure 17:
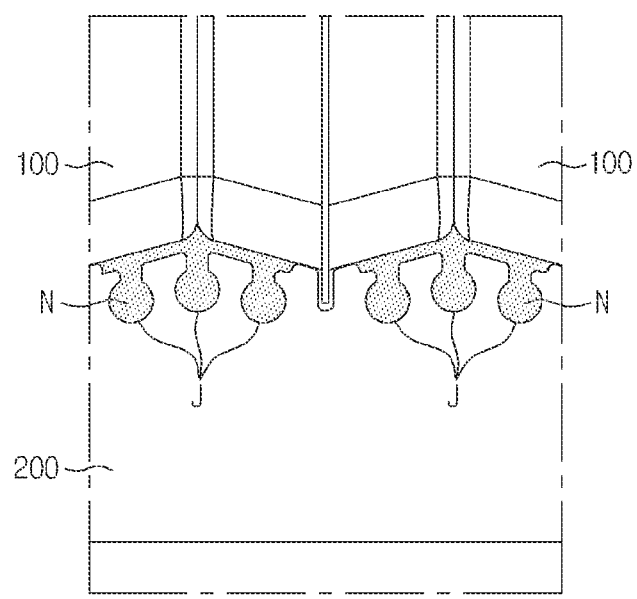
FIG. 17 is a schematic diagram illustrating a configuration of accommodation grooves according to another embodiment of the present disclosure.

FIG. 17 is a schematic diagram illustrating a configuration of accommodation grooves according to another embodiment of the present disclosure. FIG. 17 illustrates another modification of the configuration of the region A6 of FIG. 15.

Referring to FIG. 17, the accommodation grooves J may each include a portion having an increasing width downwards. That is, in FIG. 17, the accommodation grooves each have an entrance at an upper end thereof, and the adhesive N may be introduced into the accommodation groove through the entrance. Here, the upper end entrance of the accommodation groove may be wider than another portion, for example, a central portion of the accommodation groove.

According to this configuration of the present disclosure, the adhesive N may not easily get out of the accommodation groove due to a narrow portion of the accommodation groove J, such as the entrance of the accommodation groove in FIG. 17. Therefore, the capability of the accommodation grooves to retain the adhesive may be further improved.

In the above several embodiments, although the configuration, in which the secondary battery is attached and fixed to the cooling plate via the adhesive, has been mainly described, the present disclosure is not limited thereto.

Figure 18:
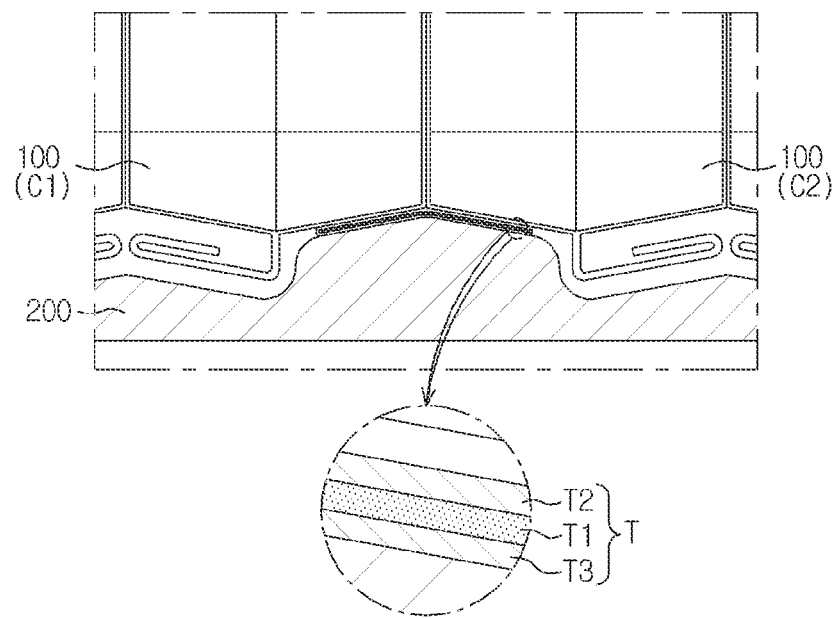
FIG. 18 is a schematic diagram illustrating a configuration in which secondary batteries are attached to a cooling plate, according to another embodiment of the present disclosure.

FIG. 18 is a schematic diagram illustrating a configuration in which the secondary battery 100 is attached to the cooling plate 200, according to another embodiment of the present disclosure. More specifically, FIG. 18 illustrates another embodiment of the configuration of the region A3 of FIG. 3.

Referring to FIG. 18, the secondary battery 100 may be attached to the cooling plate 200 via a double-sided adhesive tape T. That is, the double-sided adhesive tape T is arranged between the secondary battery 100 and the cooling plate 200, and the secondary battery 100 and the cooling plate 200 are attached to the double-sided adhesive tape T, whereby the secondary battery 100 and the cooling plate 200 may be bonded and fixed to each other.

Here, the double-sided adhesive tape T may have a film shape and may include adhesive layers T2 and T3 on both surfaces thereof. In addition, the lower surface of the secondary battery 100 may be bonded to an upper surface of the double-sided adhesive tape T, and the upper surface of the cooling plate 200 may be bonded to a lower surface of the double-sided adhesive tape T. The double-sided adhesive tape T may include a base layer T1 between the adhesive layers T2 and T3 to maintain the shape thereof and secure a certain level or higher of stiffness. For example, the double-sided adhesive tape T may have a configuration in which the adhesive layers T2 and T3 are respectively coated on both surfaces of the base layer T1 including a material such as PE foam or acrylic foam.

According to this configuration of the present disclosure, a process of arranging the double-sided adhesive tape T at a desired position on a surface of the secondary battery 100 or the cooling plate 200 may be facilitated, and there may not occur problems such as the flow-down of the adhesive, and the like. In addition, when the base layer T1 includes a foam material or the like, if impact or vibration is applied to the battery module, the base layer T1 may at least partially absorb the impact or vibration, thereby reducing breakage of the secondary battery 100.

A battery pack according to the present disclosure may include one or more battery modules according to the present disclosure. In addition, the battery pack according to the present disclosure, in addition to the battery modules, may further include a pack case for receiving the battery modules, and various devices for controlling charge and discharge of the battery modules, for example, BMS, a current sensor, a fuse, and the like.

The battery module according to the present disclosure may be applied to automobiles such as electric vehicles or hybrid vehicles. That is, an automobile according to the present disclosure may include the battery module according to the present disclosure. In particular, in the case of automobiles obtaining driving power from batteries, such as electric vehicles, the cooling capability of the battery module is extremely important. Therefore, when the battery module according to the present disclosure is applied to theses automobiles, stable and safe battery modules due to effective cooling capability may be provided.

Although the present disclosure has been described in detail with reference to some embodiments in conjunction with the accompanying drawings, it should be understood that the present disclosure is not limited by the foregoing embodiments, and that various modifications and changes can be made by one of ordinary skill in the art without departing from the scope of the disclosure.

As used herein, terms indicating directions such as "up", "down", "left", "right", "front", and "rear" indicate relative positions and are only for convenience of description, and it will be obvious to those skilled in the art that these terms may vary depending upon positions of an object, positions of an observer, or the like.

What is claimed is:

1. A battery module comprising:
a plurality of pouch-type secondary batteries arranged in parallel to each other, each pouch type secondary battery comprising an electrode assembly, and a receiving portion configured to receive the electrode assembly and a pouch exterior;
a plate arranged under the plurality of pouch-type secondary batteries to support the plurality of pouch-type secondary batteries; and
a thermally conductive adhesive between the plurality of pouch-type secondary batteries and the plate,
wherein the plate includes a plurality of recesses respectively separated by a distance, and
wherein each of the plurality of recesses receives at least one of a portion of the pouch exterior and a portion of the thermally conductive adhesive,
wherein the plate further includes a plurality of protrusions protruding toward the plurality of pouch-type secondary batteries starting from bottoms of the plurality of recesses,
wherein the plurality of protrusions are respectively located to separate the plurality of recesses that are adjacent to each other, and
wherein a shape of a top surface of each of the plurality of protrusions is same as a shape of a bottom surface of each of the plurality of recesses.

2. The battery module according to claim 1, wherein each protrusion has an uppermost surface that is equal to or higher than each of the plurality of plurality of recesses.

3. The battery module according to claim 1, wherein each of the plurality of recesses has a depth from an upper surface to a lower surface of the plate.

4. The battery module according to claim 1, wherein lower portions of the plurality of secondary batteries are attached and fixed to an upper surface of the plate via the thermally conductive adhesive.

5. The battery module according to claim 1, wherein the pouch exterior has a sealing portion, and
wherein the sealing portion is received in at least one of the plurality of recesses.

6. The battery module according to claim 1, wherein the plurality of protrusions and the plurality recesses are arranged in an alternating pattern in a stacking direction of the plurality of pouch-type secondary batteries.

7. The battery module according to claim 1, wherein each of the plurality of recesses extend in a longitudinal direction of the plurality of pouch-type secondary batteries.

8. The battery module according to claim 1, wherein the plurality of recesses have lengths that are the same.

9. The battery module according to claim 1, wherein the plurality of recesses receive the portion of the thermally conductive adhesive.

10. The battery module according to claim 1, wherein the thermally conductive adhesive extends from one recess to another recess adjacent to the one recess among the plurality recesses.

11. The battery module according to claim 1, wherein the plurality of recesses are formed vertically into the plate.

12. The battery module according to claim 1, wherein the plurality of recesses include a first recess to receive the portion of the pouch exterior and a second recess to receive the portion of the thermally conductive adhesive.

13. The battery module according to claim 12, wherein a depth of the first recess is equal to or greater than a depth of the second recess.

14. The battery module according to claim 1, wherein the plurality of pouch-type secondary batteries are attached and fixed to the plate via a double-sided adhesive tape comprising an adhesive layer on both surfaces thereof.

15. A battery pack comprising the battery module according to claim 1.

16. An automobile comprising the battery module according to claim 1.

17. The battery module according to claim 12, wherein each pouch type secondary battery overlaps one of the first recess and the second recess.

18. The battery module according to claim 1, wherein the plate is a cooling plate including a thermally conductive material, and is configured to transfer heat generated from the plurality of pouch-type secondary batteries to an outside of the battery module.

19. A battery comprising:

a plurality of pouch-type secondary batteries arranged in a first direction, and having a pouch exterior;

a plate arranged under the plurality of pouch-type secondary batteries; and a thermally conductive adhesive between the plurality of pouch-type secondary batteries and the plate, wherein the plate includes a plurality of recesses separated by a distance, wherein each of the plurality of recesses receives at least one of a portion of the pouch exterior and a portion of the thermally conductive adhesive, wherein the plate further includes a plurality of protrusions protruding toward the plurality of pouch-type secondary batteries starting from bottoms of the plurality of recesses, wherein the plurality of protrusions are respectively located to separate the plurality of recesses that are adjacent to each other, and wherein a shape of a top surface of each of the plurality of protrusions is same as a shape of a bottom surface each of the plurality of recesses.

20. The battery according to claim 19, wherein the plurality of recesses are arranged in an alternating pattern.

21. The battery according to claim 19, wherein lengths of the plurality of recesses extend in a second direction different from the first direction.

22. The battery module according to claim 1, wherein the plurality of recesses are arranged at intervals in a stacking direction of the plurality of pouch-type secondary batteries.

23. The battery according to claim 19, wherein the plurality of recesses are arranged at intervals in the first direction to correspond to the plurality of pouch-type secondary batteries.

* * * * *